Oct. 28, 1969    E. I. GORDON    3,475,078
GUNN-EFFECT LIGHT MODULATOR
Filed Nov. 15, 1965
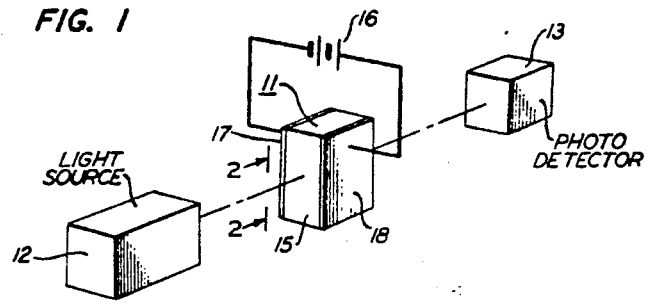
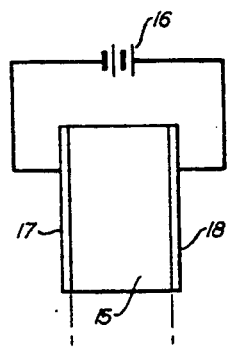
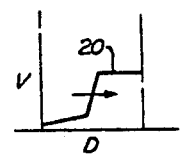
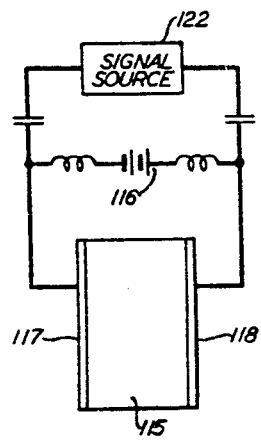
INVENTOR
E. I. GORDON
ATTORNEY { # United States Patent Office 3,475,078
Patented Oct. 28, 1969

3,475,078
GUNN-EFFECT LIGHT MODULATOR
Eugene I. Gordon, Convent Station, N.J., assignor to Bell Telephone Laboratories, Incorporated, New York, N.Y., a corporation of New York
Filed Nov. 15, 1965, Ser. No. 507,732
Int. Cl. G02f 1/28, 1/36; H04b 9/00
U.S. Cl. 350—160                                    6 Claims

ABSTRACT OF THE DISCLOSURE

Traveling electric field domains in a wafer of a Gunn-effect diode are used to modulate a light beam. The frequency and amplitude of light beam modulations may be controlled by controlling the voltage applied to the diode contacts.

---

This relates to light modulators, and more particularly, to electro-optic light modulators comprising bulk semiconductors.

The advent of the laser has stimulated considerable effort toward developing efficient light modulators. It is widely recognized that communications systems using modulated laser-generated coherent light may offer significant advantages over conventional systems, particularly with regard to bandwidth and structural simplicity. Among the many light modulators that have been proposed are the electro-optic modulators, one example of which is described in the paper "Design of a Microwave-Frequency Light Modulator," by R. H. Blumenthal, Proceedings of the IRE, Vol. 50, No. 4, April 1962, p. 452.

Electro-optic modulators employ a transparent or partially transparent crystal, having either a refractive index or a loss characteristic that varies as a function of applied electric field intensity. Numerous publications in the art describe how a signal voltage can be used to modulate the phase, polarization, or intensity of a light beam passing through an electro-optic crystal by varying the refractive index or loss of the crystal. One drawback of these devices is that a fairly high signal voltage is generally required for useful modulation. At high modulating frequencies, the available signal power may be limited. Moreover, if the applied electric field intensities are too high they may deteriorate or destroy the structure of the crystal.

I have found that many of these drawbacks can be avoided by using as the electro-optic element a wafer of "bulk semiconductor" material that is capable of generating what is known as "bulk effect" oscillations or "Gunn effect" oscillations. The term "bulk semiconductor" is used herein to designate semiconductive material having a substantially homogeneous constituency; it does not include any discernible p-n rectifying junctions. As is explained in the paper "Instabilities of Current in III–V Semiconductors" by J. B. Gunn, IBM Journal, April 1964, and in the commonly assigned patent application of Hakki et al., Ser. No. 465,266, filed June 21, 1965, and now abandoned, a direct current voltage applied between ohmic contacts on opposite sides of certain bulk semiconductor wafers will establish high frequency current oscillations within the wafer. These oscillations result from the formation of discrete regions of high electric field intensity that travel from one of the contacts to the other. The electric field regions are known as traveling electric field domains, and can be formed in materials having two energy bands that are separated by an appropriately small energy gap. Fortuitously, n-type gallium arsenide is transparent to near infra-red light, it displays electro-optic characteristics, and it is capable of forming Gunn effect traveling domains.

In accordance with one feature of the invention, a bulk semiconductor wafer of n-type gallium arsenide is used to modulate a light beam. Light to be modulated is directed through polished or cleaved faces of the wafer, and simultaneously, traveling domains of high electric field intensity are established as described above. The field intensity within each domain is much higher than any field that can be safely produced within the wafer by conventional methods. The electro-optic effects induced within the wafer are therefore much more pronounced and the beam is more efficiently modulated than would otherwise be possible. Relatively high frequency oscillations can be established within the wafer either spontaneously, at a frequency determined by the geometry of the wafer, or at a specific controllable frequency corresponding to a weak applied signal. In the latter case, most of the energy for modulation is derived from direct current energy; if spontaneous oscillations are used, no radio-frequency power at all is required.

In accordance with a feature of one embodiment of the invention, the direct current voltage across the wafer is maintained just slightly below the threshold voltage for maintaining spontaneous Gunn effect oscillations. A low power microwave signal is then used to initiate traveling domain oscillations. In this way, signal information can be translated into modulations of the light transmitted through the device. Several alternative techniques can be used for applying information to a light beam in accordance with this embodiment.

These and other features of my invention will be better understood from a consideration of the following detailed description, taken in conjunction with the accompanying drawing, in which:

FIG. 1 is a schematic illustration of light modulation apparatus in accordance with one embodiment of the invention;

FIG. 2 is a view of the light modulating device of FIG. 1;

FIG. 2A is a graph of voltage versus distance along the light modulating device of FIG. 2; and FIG. 3 is a view of a light modulating device in accordance with another embodiment of the invention.

Referring now to FIG. 1, there is shown a light modulator 11, a light source 12 and a light detector 13. The light source 12 is preferably a laser oscillator for generating a coherent light of predetermined frequency, together with the usual mirrors and lenses for appropriately forming and projecting a coherent light beam. The purpose of the detector 13 is to convert light wave modulations to electrical energy and transmit it to an appropriate load. It may, for example, be of the type described in the patent application of N. C. Wittwer, Jr., Ser. No. 214,302, filed Aug. 12, 1962, now U.S. Patent No. 3,215,-844, which comprises a photocathode for directing photoelectrons against the inner conductor of a coaxial cable in response to light beam impingement.

The modulator 11 comprises a wafer 15 of bulk semiconductor essentially monocrystalline material to which an electric field is applied by a direct current voltage source 16 and a pair of ohmic contacts 17 and 18. Since wafer 15 transmits light to be modulated, it must, of course, be transparent or at least partially transparent and have optically smooth faces. In accordance with the invention, the wafer is made of semiconductor material which is appropriate for the establishment of Gunn-effect oscillations. Such oscillations can occur in a semiconductor having lower and upper energy bands within the conduction band that are separated by only a relatively small energy gap. The carrier concentration is normally greater in the lower energy band than in the upper band and in gallium arsenide the mobility of the carriers in the lower energy band exceeds that of the upper energy band carriers.

When an appropriate voltage is applied between contacts 17 and 18 of FIGS. 1 and 2, a region of slightly higher resistivity is formed at the negative electrode (in an n-type device). This results from an electric field induced transfer of charge carriers to the higher energy band and from the fact that electrons in the higher energy band have lower mobility. Associated with the higher resistivity region is an accumulation of space charge and increased localized electric field intensity, referred to as an electric field domain. The increased local electric field causes a further redistribution of charge. Consequently, the domain is fundamentally unstable and once formed, the local carrier redistribution and electric field intensity increase. Simultaneously, the electric field domain moves toward the positive electrode and grows in intensity due to a further transfer of current carriers from the lower to the upper energy band. The lower mobility or higher resistivity of the upper energy band contributes to the cumulative increase of electric field intensity as the domain travels to the positive electrode. The electric fields outside of the moving or traveling domain usually decrease in intensity so that a new domain cannot easily be formed at the negative electrode. After the traveling domain reaches the positive electrode, the carriers in the upper band fall back to the lower band, the domain is extinguished, and the process is repeated. As a result, current flows in the wafer in the form of pulses separated approximately by a period T given by $$T = L/v_d \qquad (1)$$

where L is the wafer thickness between contacts 17 and 18, and $v_d$ is the drift velocity of the traveling domain. It follows that the frequency $f_g$ of the Gunn-effect oscillations is given approximately by $$f_g = v_d/L \qquad (2)$$

As is pointed out in the above-mentioned Hakki et al. application, the formation of Gunn-effect oscillations requires that the wafer 15 have the following characteristics: the two energy bands are separated by a sufficiently small energy level so that population redistribution can take place at field intensities that are not so high as to be destructive of the material; at zero field intensities, the carrier concentration in the lower energy band is more than approximately 100 times that in the upper energy band at the temperature of operation; the mobility of carriers in the lower energy band ($\mu_1$) is more than approximately 5 times greater than the mobility in the upper energy band ($\mu_2$). In addition, a material used as an electro-optic modulator must be transparent or at least partially transparent and have a refractive index or light absorption characteristic that varies as a function of electric field intensity. Appropriately doped n-type gallium arsenide fulfills all of these requirements. The wafer of one experimental model was, for example, doped to a carrier concentration in the lower (stable) energy level of approximately $2 \times 10^{14}$ carriers per cubic centimeter.

An electric field domain traveling between contacts 17 and 18 is graphically represented by curve 20 of FIG. 2A which is a graph of voltage V versus distance D between contacts in the wafer 15 of FIG. 2. The region of high electric field intensity (resulting in an abrupt voltage drop) travels from the negative electrode 17 to the positive electrode 18 as shown by the arrow of FIG. 2A. This high field intensity may radically alter the local index of refraction of the material. Alternatively, the high electric field may change the wavelength of the conduction band absorption edge thereby changing the absorption experienced by transmitted light of wavelengths longer than that associated with the absorption edge. Hence, light which passes through the traveling domain is refracted or absorbed to a much greater degree than light that does not intercept the domains. Although I am not sure precisely how the refraction affects the characteristics of the light beam, I have determined experimentally that the detected light beam is in fact intensity modulated. When the light beam impinges on the photodetector 13 of FIG. 1, these modulations are converted to an electromagnetic oscillation which is a faithful reproduction of the oscillatory frequency of the wafer 15. It is possible that the field domains refract part of the light to so high a degree that it does not impinge on the photodetector; the light beam is therefore effectively intensity modulated. Absorption effects yield intensity modulation directly.

One way of transmitting information by the apparatus shown on FIG. 1 would be to insert a switch in the direct current circuit to pulse modulate the Gunn-effect oscillations. Since the frequency of the Gunn-effect pulses are readily determinable by Equation 2, various useful switching schemes for transmitting information will be readily apparent to those skilled in the art.

Another signal transmitting system which is perhaps more flexible is shown in FIG. 3. In the device of FIG. 3, the voltage of battery 116 is slightly below the threshold voltage $E_{osc}$ for spontaneous Gunn-effect oscillations. The threshold voltage at which the wafer 115 will oscillate spontaneously is given approximately by $$\left( E_{osc} = \frac{1 + \dfrac{a}{L}\dfrac{v_{01}}{\omega_{d1}}}{k - 1 - \dfrac{a}{L}\dfrac{v_{01}}{\omega_{d1}}} \right) E_c \qquad (3)$$

where $a$ is the negative attenuation of domain current in the wafer, $E_c$ is the bias electric field intensity at which the carrier densities in the two energy bands are equal, $\omega_{d1}$ is the dielectric relaxation frequency in the lower energy band, $v_{01}$ is the current carrier drift velocity in the lower energy band, and $k$ is a constant. It should be noted that the precise value of $E_{osc}$ depends on the external microwave circuit into which the semiconductor wafer is placed.

At voltages slightly below the threshold voltage $E_{osc}$, the amplitude of Gunn-effect oscillatory current is a function of the applied microwave electric field intensity. In the device of FIG. 3, the voltage from a relatively low power signal source 122 is used to initiate the domain formation. The rate of domain formation is precisely the microwave frequency so that the current oscillates at the applied microwave frequency. A varying amplitude and frequency of the signal voltage will therefore be manifested by Gunn-effect oscillations of varying and controllable amplitudes and frequency by which information may be applied to a light beam directed through the wafer 115. For effective amplitude modulation the signal frequency should be reasonably close to the spontaneous oscillation frequency defined by Equation 2; preferably, the signal frequency band is centered on the frequency $f_g$. Pulse code modulation is clearly feasible in the device of FIG. 3, since pulses from signal source 122 could be used to trigger oscillatory current pulses in the wafer 115.

The light beam to be modulated should not be so intense as to, by itself, create a population redistribution of the energy bands; in other words, the light beam should not optically pump the device. Further, the photon energy of the light beam should be smaller than the band gap or energy separation between the conduction and valence bands of the material. This is stated mathematically as, $$h\nu < \Delta E \qquad (4)$$

where $h$ is Planck's constant, $\nu$ is the frequency of the light beam, and $\Delta E$ is the band gap energy.

The contacts 17 and 18 should form substantially ohmic contacts with wafer 15 in the manner characteristic of Gunn effect operation. Also, the wafer surfaces through which the light beam is transmitted should be optically smooth to minimize spurious refraction.

These surfaces may be polished, or they may be formed by proper cleavages of the wafer along crystallographic planes. In an experimental model, the length of the wafer between contacts 17 and 18 was 2 mils, the height was 5 mils, and the thickness was 5 mils, although other dimensions could be used. Microwave signal energy and direct current bias fields are preferably applied by mounting the semiconductor wafer in a microwave resonant cavity in a manner known in the art.

From the foregoing it can be seen that my preferred embodiment offers advantages of simplicity since the main component is merely a substantially homogeneous wafer of bulk gallium arsenide with ohmic contacts and polished faces for admitting light. The signal frequency power requirements are very small since most of the energy for modulating the light beam is derived from a direct current source.

It is to be understood that the described embodiments are merely illustrative of the inventive concept. Various other embodiments and modifications can be devised by those skilled in the art without departing from the spirit and scope of the invention.

What is claimed is:
1. A light modulator comprising:
   a wafer of bulk semiconductor material of the type which is capable of internally forming and propagating traveling electric field domains in response to an applied electric field which is above a threshold value $E_{osc}$, and also being characterized by an energy band gap separating valence and conduction bands; ohmic contacts to the wafer;
   means for applying to the contacts a voltage including a signal voltage, the amplitude of which varies with time;
   a voltage applied to the ohmic contacts giving rise, at least intermittently, to an electric field within the wafer that exceeds $E_{osc}$, thereby to form traveling electric field domains;
   and means for directing a light beam to be modulated through the wafer at an angle with respect to the direction of propagation of the traveling domains;
   the photon energy of the light beam having an average value that is smaller than said band gap energy.
2. The light modulator of claim 1 wherein:
   the applied voltage includes a direct-current voltage component which produces an electric field in the wafer that is lower than the threshold field $E_{osc}$;
   and the signal voltage is small with respect to the direct-current voltage component.
3. The light modulator of claim 1 wherein:
   the wafer is of the type in which conduction by carriers can take place in upper and lower energy bands;
   and the threshold field $E_{osc}$ is approximately defined as

$$E_{osc} = \left( \frac{1 + \frac{a}{L} \frac{v_{01}}{\omega_{d1}}}{k - 1 - \frac{a}{L} \frac{v_0}{\omega_{d1}}} \right) t'_e$$

where $a$ is the negative attenuation of domain current in the wafer, $L$ is the path length of travel of the traveling domain, $v_{01}$ is the current carrier drift velocity in the lower energy band, $\omega_{d1}$ is the dielectric relaxation frequency of the lower energy band, $E_c$ is the electric field intensity at which the carrier densities in the two energy bands are equal, and $k$ is a constant.

4. The light modulator of claim 3 wherein:
   the signal amplitude varies at a mean frequency substantially equal to the average velocity of the traveling domains divided by the distance separating the ohmic contacts.
5. The light modulator of claim 4 wherein:
   the light beam is directed through the wafer in a direction substantially perpendicular to the direction of travel of the traveling domains.
6. The light modulator of claim 5 wherein the wafer is of n-type gallium arsenide.

References Cited

UNITED STATES PATENTS

| 3,259,016 | 7/1966 | Rosenblum | 350—160 |
| 3,331,036 | 7/1967 | Coblow. | |
| 3,365,583 | 1/1968 | Gunn | 307—205 |

OTHER REFERENCES

Gunn: "Light Modulator," IBM Tech. Disc. Bull., vol. 7, pp. 1202–5, May 1965.

Leavitt et al.: "Light Modulator," IBM Tech. Disc. Bull., vol. 6, p. 83, July 1963.

Liu et al.: "Beam Deflection," Proc IEEE, vol. 53, pp. 522–23, May 1965.

JEWELL H. PEDERSEN, Primary Examiner

E. BAUER, Assistant Examiner

U.S. Cl. X.R.

250—199